(12) United States Patent
Willburger et al.

(10) Patent No.: US 8,729,994 B2
(45) Date of Patent: May 20, 2014

(54) ROTARY SOLENOID

(75) Inventors: Winfried Willburger, Kirchdorf (DE); Daniel Kreuzer, Kellmuenz (DE)

(73) Assignee: SVM Schultz Verwaltungs-GmbH & Co. KG, Memmingen (DE)

( * ) Notice: Subject to any disclaimer, the term of this patent is extended or adjusted under 35 U.S.C. 154(b) by 291 days.

(21) Appl. No.: 12/972,576

(22) Filed: Dec. 20, 2010

(65) Prior Publication Data
US 2011/0187483 A1    Aug. 4, 2011

(30) Foreign Application Priority Data

Dec. 22, 2009    (DE) .......................... 10 2009 060 407

(51) Int. Cl.
*H01F 7/08*    (2006.01)
*H02K 37/12*    (2006.01)
*H02K 37/10*    (2006.01)

(52) U.S. Cl.
CPC .............. *H02K 37/125* (2013.01); *H02K 37/10* (2013.01)

USPC ..................... 335/272; 310/49.02; 310/49.21; 310/49.32; 310/49.36; 310/49.53; 310/49.55; 310/268; 335/229; 335/230

(58) Field of Classification Search
CPC .............................. H02K 37/10; H02K 37/125
USPC ............... 335/228, 229, 230, 272; 310/49.02, 310/49.21, 49.32, 49.36, 49.53, 49.55, 268
See application file for complete search history.

(56) References Cited

U.S. PATENT DOCUMENTS 4,207,483 A * 6/1980 Baer .......................... 310/49.07
5,677,659 A * 10/1997 Porcher .......................... 335/272

* cited by examiner

*Primary Examiner* — Ramon Barrera
(74) *Attorney, Agent, or Firm* — Mark Terry

(57) ABSTRACT

The invention refers to a Rotary Solenoid comprising a stator and rotor that can rotate around a rotational axis. The rotor has a rotor shaft on which a rotor disc is arranged. The rotor disc is, seen in the direction of the circumference, polarized alternating magnetically. The stator carries at least one coil. On the coil windings of electrically conducting wire are provided. For guiding the magnetic flow of the magnetic field generated by the coil a pole face consisting of several partial pole faces is provided.

19 Claims, 3 Drawing Sheets

ROTARY SOLENOID

Figure 1:
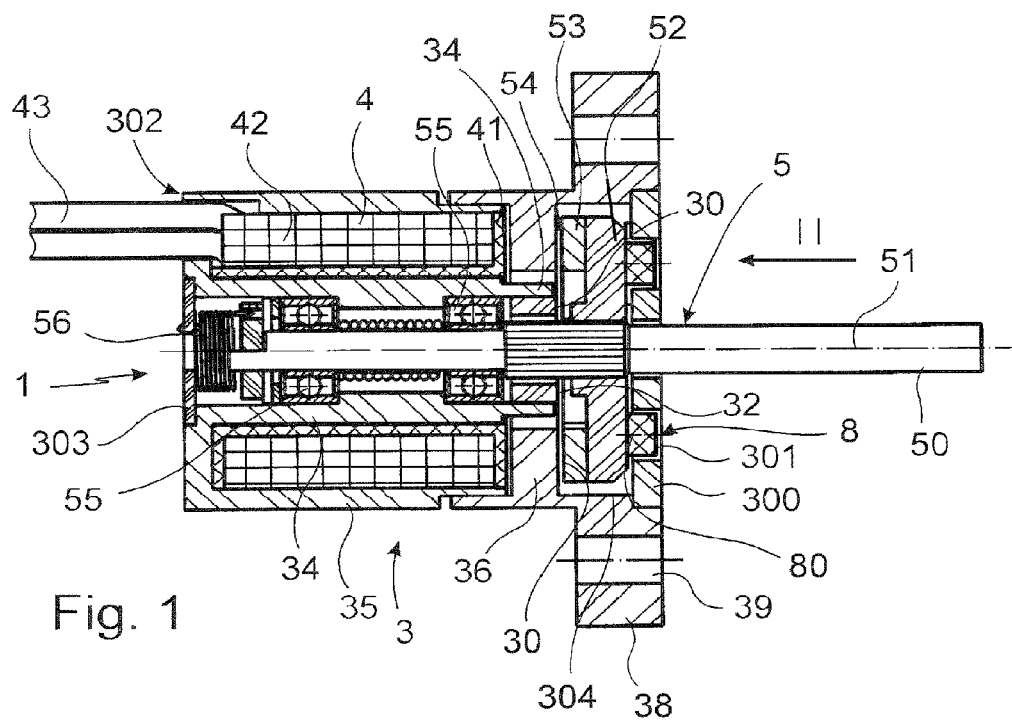

The invention refers to a Rotary Solenoid comprising a stator and a rotor rotatable around a rotational axis, wherein the rotor has a rotor shaft on which a rotor disc is arranged, and the rotor disc is polarized magnetically alternating, seen in the direction of the circumference, and the stator receives at least one coil that carries windings of electrically conducting wire, and between the coil and the rotor disc a pole face preferably arranged rectangular to the rotational axis is provided.

BACKGROUND OF THE INVENTION

Rotary Solenoids of this type are drives basing on the electro magnetic principle where, instead of a longitudinal motion, the result is a rotary motion. Rotary Solenoids of this kind are known, for example, as rotary proportional solenoids carrying out a rotary motion proportional to the current flow because of the current flow through the windings.

In the state of the art it is known not to realize a magnetic field arrangement rotational symmetric with respect to the rotational axis, but one asymmetric to it, if possible. This heterogeneously asymmetric magnetic field then interacts with the magnetized rotor disc. This magnetic field is generated by coils flown through by electric current. The different arrangement of north and south poles on the rotor disc (this is polarized magnetically alternating) then tries to be positioned appropriately in the generated magnetic field of the solenoid, that means to move or rotate.

In the state of the art it is known for that to arrange two or more rather complex coil forms in the stator to achieve the desired distribution of the flow of the magnetic field lines.

This is reached by an arrangement of several coils that have to be winded rather complicatedly around the rotational axis; that means the respective point of gravity of the coil is not on the rotational axis.

The result of this construction are rather expensively produced Rotary Solenoids as the single coils cannot be winded up on cylinder-shaped coil forms, but special forms, which have to be covered with wire windings, are required here that have to be provided, if necessary, also by using special production methods that are correspondingly expensive. Thus, each single coil has to be produced rather expensive, and also a rather large amount of coils has to be supplied arranged spaced apart from the rotational axis to result in an appropriate distribution of the magnetic field lines. Besides the high manufacturing costs, these suggestions according to the state of the art also have a rather large constructive space.

SHORT ABSTRACT OF THE INVENTION

It is an object of the present invention to improve the state of the art in such a way that at least one of the before-mentioned disadvantages is overcome.

In order to solve this problem the invention refers to a Rotary Solenoid as described in the beginning, and suggests that the pole face consists at least of two partial pole faces serving for the guide of the magnetic flow of the magnetic field generated by the supplying of current to the winding of the coil, whereby at the pole face a magnetically alternating polarization, referring to the rotational axis seen in the direction of the circumference, exists. The invention suggests furthermore that the windings of the coil enclose the rotational axis.

The suggestion according to the invention achieves that standard coils can be used with rotary drives according to the invention. The use of standard coils is convenient in two respects, as, on the one hand, the winding technique on a cylinder-shaped coil form is probably known, and no other special production methods are required either, the production is therefore economic. In contrast to the state of the art it is already sufficient if one coil (without restricting the invention to this) is used, that means the Rotary Solenoid according to the invention requires a lower number of coils that can be produced more economic. The arrangement of the coil is here such that the windings enclose the rotational axis, that means the rotational axis extends within the coil. The result is surprisingly a very space-saving construction as the single special coils in the area of the circumference of the rotational axis according to the state of the art can be deleted. Through the division of the pole face into at least two partial pole faces, the desired guide of the magnetic flow or the magnetic field lines is achieved. The arrangement of the single partial pole faces is here chosen in such a way that in the direction of the circumference seen with reference to the rotational axis, an alternating magnetic polarization results when electric current flows through the wire of the windings of the coil and generates the magnetic field.

The rotor disc is here accordingly supplied magnetically, for example, the rotor disc itself consists of a permanent magnetic material or carries an appropriate coating with corresponding alternating polarization, or on the rotor disc an additional collar or ring of permanent magnets in the desired shape is arranged wherein the rotor disc then consists for example of ferromagnetic material. The suggestion according to the invention comprises all these solutions.

In a preferred embodiment of the invention between the partial pole faces a pole gap is provided extending in radial direction with reference to the rotational axis. The appropriate design of the partial pole face limited on the side of the edge by a pole gap, makes it possible to control the rotation or point symmetric distribution of the magnetic field lines, which usually is the result of a coil flown through by current, in such a way that the result is a course of the magnetic field lines differing from the rotation- or point-symmetry. The invention uses here the characteristic that by the appropriate arrangement of soft-magnetic material guiding the magnetic field lines (for example a suitable iron alloy or the like) the result is a heterogeneous distribution of the magnetic field lines. Of course, the invention does not exclude here that, for example, connection bridges forming for production reasons bridge the pole gap between the two partial pole faces; a connection of this type (metallic or magnetically conducting), however, only the efficiency decreases, the effect according to the invention is not missed at all.

According to the invention it is suggested that the pole gap occurring between the two partial pole faces is filled by a, for example, magnetically less active or inactive material, or that the pole gap is an air pole gap.

It is equivalent for the invention whether the occurring pole gap is filled or open. The used filling material, for example a polymer or the like, serves for connecting the partial pole faces closely with each other, to suppress a flow of the magnetic field lines, if possible, thus to be as isolating as possible.

The arrangement of the different partial pole faces is here realized in such a way that, seen in the direction of the circumference (with respect to the rotational axis) an alternating, magnetic polarization exists. Cleverly, here, for example, in a modification according to the invention, an arrangement is chosen where a first exterior partial pole face encloses a second, interior partial pole surface. Here the first, exterior partial pole face is, for example, part of a larger component in which then in an appropriate way the second, interior partial pole face is inserted, wherein cleverly between these two partial pole faces a pole gap remains. Preferably an axial-symmetric design of the partial pole face is used. Thus, at least one or only a few axes of symmetry are provided in the design of the partial pole face to achieve an appropriate identical behavior of the Rotary Solenoid (independently from its respective position).

The pole face is, according to the invention, divided into at least two partial pole faces. These two partial pole faces; however, are coplanar to each other, that means, points of the first as well as of the second or all partial pole faces are in one common plane. In particular, the surface facing the rotor disc is seen here as partial pole face. Because of the rectangular arrangement of the pole face and thus also of the partial pole faces with respect to the rotational axis, the result is, independently from the position of the rotor, an air gap of the same size between the rotor disc and the pole face.

In a preferred embodiment of the invention the second, in particular interior partial pole face seen from the top is designed longitudinally. It is realized square-like wherein on the longitudinal sides in the end area appropriate (radial extending) expansions can be provided. The ratio of the length to the breadth of this partial pole face is here about 2:1, according to the invention it can be in an interval of 1.5:1 up to 4:1. It is clear, that by the design of the interior but also of the exterior partial pole face the magnetic characteristic of the Rotary Solenoid can be set. The invention comprises here modifications of the partial pole face having a two-part symmetry (symmetric only with reference to two axes of symmetry), as well as also solutions with a four-, six-, or eight-part (or more-part) symmetry. The resulting, correspondingly more complex partial pole faces then adjust, if necessary, to a more circular exterior silhouette. If the symmetry is two-part, the partial pole face is, for example, designed symmetrically along its longitudinal axis and the transverse axis rectangular to it.

Cleverly in different partial pole faces different magnet poles are associated, interacting in an appropriate way with the alternating, magnetically polarized areas of the rotor disc.

In a modification according to the invention the stator is designed such that it encloses or encircles the coil, and serves as housing. As the coil is designed rotationally symmetric, in particular cylinder-shaped, the stator also has a basically cylinder-shaped or pot-like design. The arrangement is here, if necessary, chosen in such a way that the stator is supported on the outside and/or inside of the coil for guiding purposes. In particular, it is provided in a modification according to the invention that the stator has an in particular pin-like center pole penetrating the coil and carrying the second, interior partial pole face. The arrangement is here chosen such that the center of gravity of the second, interior partial pole face comes to rest on the rotational axis. The result is here a centered arrangement as exact as possible of the interior second partial pole face.

According to the invention it is provided that the stator serves for the guide of the magnetic flow of the magnetic field generated by the supplying of current to the winding of the coil, and is manufactured preferably of soft-magnetic iron. Instead of the soft-magnetic iron, according to the invention, all other materials can be employed serving perfectly for a guiding of the magnetic flow. As it can be seen in particular in the drawing (in particular FIG. 1) the stator is designed pot-like with a centrically or coaxially arranged center pole. However, just the exterior area enclosing the coil is cleverly now used for guiding the magnetic field what improves the efficiency of the entire arrangement considerably. As such an arrangement is not known in the state of the art, the measurement achieves a surprising advantage where not only the stationary function of a rotary arrangement is associated to the stator, but it takes over additionally the function of guiding the magnetic field as well as the function of a housing.

In a preferred modification of the invention it is provided that the stator is deigned multi-part, and at least one case part receives the coil, and a lid part is linked to the case part and seals it. The multi-part construction allows to insert the coil in a first part, the case part, and to seal it by a second part, the lid part. The two parts are, for example, pressed or jammed to one another and thus connected for a perfect guide of the magnetic flow. Besides these mechanic connection methods, of course, also other methods for linking can be used, these are, for example, linking by means of a screw connection or welding, gluing or soldering. Besides the two-part design of the stator described here, it is, of course, also possible to form the stator of three or more components. A multi-part design can have in particular reasons for and advantages in manufacturing.

Cleverly the arrangement is here chosen such that the stator forms a partial pole face wherein this (first, exterior) partial pole face is arranged in particular in or on the lid part. According to the invention it is provided here that the stator, in particular the lid part, has a recess in the area of the first partial pole face for receiving the second partial pole face, and the shape of the recess corresponds with the shape of the second partial pole face, and between the two partial pole faces a pole air gap extends at least partly.

The invention also comprises that the stator also receives several partial pole faces in an appropriate way. In particular, the invention extends to modifications consisting of three, four or even more single partial pole faces. Of course, a partial pole face can be formed in one piece with the stator or a piece of the stator (for example the lid part).

It is advantageous when for fastening reasons at least one fastening opening is provided on the lid part. The fastening opening is, for example, arranged in a flange-like projection.

In a preferred embodiment of the invention it is provided that the rotor disc carries at least one ring of permanent magnets on its side facing the coil. This ring of permanent magnets consists here of a larger number of permanent magnets identical with reference to their dimension as well as also to their rest magnetization. The single permanent magnets are put together to a ring (with constant radius) the center of which is on the rotational axis, so that preferably an arrangement of single ring sectors with identical length is the result. If the single permanent magnets have also the same magnetization, the course of the magnetic field lines is at least almost identical in the area of the single sectors. The arrangement is here chosen such that the result is an alternating polarization, that means an alternating arrangement of the magnetic poles seen in the direction of the circumference (with reference to the rotational axis of the rotor disc).

In a preferred embodiment of the invention the length of the second interior partial pole face corresponds, essentially with the radius of the ring of permanent magnets. It has already been described that through the arrangement of the partial pole faces, in particular of the interior partial pole face, a heterogeneous distribution of the otherwise homogeneous, point- or rotational-symmetric distribution of the magnetic field lines of a coil flown through by current is the result. In the suggestion according to the invention to approach the length of the second (interior) partial pole face essentially to the radius of the ring of permanent magnets, a concentration of the magnetic field lines emerging from the coil in the radial area of the permanent magnets is the result, and thus a corresponding development of power. Therefore it is convenient that the (second) partial pole face is designed preferably extending longitudinally, square-like. A square-like design is in particular a shape as it is shown in particular in FIG. 2.

For a behavior of the Rotary Solenoid as homogenous as possible (independent from its actual position of the rotor disc) it is favorable when the air gap in axial direction (with reference to the rotational axis) between the pole face and the rotor disc along the pole face is the same everywhere, so that also a parallel arrangement of the pole face (and single partial pole faces arranged coplanar to it) to the rotor disc or the ring of permanent magnets results.

When the air gap between the pole face and the rotor disc, and of the pole gap between the single partial pole faces are cleverly dimensioned, the behavior of the Rotary Solenoid is characterized or optimized. Thus it is suggested according to the invention, that the air gap in axial direction, with reference to the rotational axis, between the pole face and the rotor disc is smaller than the pole gap. This design "forces" the magnetic field lines leaving at the partial pole face to penetrate primarily the material of the rotor disc, and to search via this the magnetic contact to the other partial pole face. When the distances, as described, are dimensioned cleverly this behavior is controlled.

It has been found here in particular to be even more favorable to choose the sums of the breadth of the air gap and the thickness of the ring of permanent magnets smaller than the size of the pole gap.

An essential advantage of the invention is in particular the fact that the complete pole face is coplanar, that means that no elevations facing the rotor discs, or elevated sectors and so on are provided on the pole face. Through this a short construction perfected in axial direction is realized.

The Rotary Solenoid is constructed altogether asymmetrically, that means, with reference to the rotor disc the magnetic part, that is the coil, is connected only on one side; the result is a one-sided design of the rotor disc.

Preferably on the side on the rotor disc opposite the coil an in particular magnetically low active or magnetically inactive cover disc is connected. As material for the cover disc here, for example, special steel (V2A) or aluminum is suitable, or even a synthetic material or compound material. A low magnetic activity does not interfere with the effect according to the invention as the resulting distributions of loss do not prevent the effect according to the invention.

Cleverly, a limit on the angle of rotation is provided on the rotor disc or the rotor shaft. This is equipped with appropriate dampers. Conveniently, at least one pivot bearing of the rotor is provided in the stator, preferably several pivot bearings are realized for that.

The invention comprises solutions where not only one but also several coils, arranged preferably one after the other (in axial direction) are provided in the stator. It is, for example, possible to realize in a sort of modular concept with few components a larger series of Rotary Solenoids different with respect to their development of power and so on.

In a preferred embodiment of the invention an arrangement of the coil coaxial with respect to the rotational axis is provided. The coil designed preferably as cylinder-shaped coil (with a circular cross section) is orientated with reference to its longitudinal and center axes coaxially to the rotational axis, that means the longitudinal axis of the coil runs together with the rotational axis of the rotor. Also the use of a coil form or a coil with an elliptic base or cross section is provided according to the invention. The advantage of a design of this kind is the fact that here already a tendency to a heterogeneous distribution of the magnetic field in the interior of the coil exists, an elliptic coil form can be covered usually with the windings, and also here an arrangement is possible where the rotational axis extends within the elliptic coil form, that means it can be mounted very space-saving.

It is clear that the invention thus is not restricted only to rather simple, regular coil forms, but the effect according to the invention is also achieved by employing, for example, coil or coil forms that are realized in such a way that the windings on them encircle after that the rotational axis, and, for example, still can be produced in a simple manner even if their coil forms themselves are rather complex (polygonal or the like).

Furthermore it is provided in a preferred embodiment of the invention that the rotor shaft carries at least two rotor discs, and the coil is provided between the two rotor discs. In this modification according to the invention the concept for the distribution of the magnetic flow is realized on both sides of the coil. That means, also the pole face facing the second rotor disc is formed by at least two partial pole faces serving for the guide of the magnetic flow of the magnetic field generated by windings of the coil supplied with current. This pole face too can have, according to the invention, all characteristics as they have been described for the first pole face. The resulting magnetization is also alternating seen with respect to the rotational axis in the direction of the circumference. Thus, of course, a cascade-like or alternating arrangement of several coils and several rotor discs is possible according to the invention.

In another modification according to the invention it is provided that at least one partial pole face is held by the coil form of the coil. This improvement according to the invention refers to the interior partial pole face as well as also the exterior partial pole face. This means that the partial pole faces are not necessarily held by the center pole or are part of the stator, in another constructive modification it is actually clever, to use the coil form anyway provided for forming the coil also as fastening point for the partial pole faces.

BRIEF DESCRIPTION OF THE DIFFERENT VIEWS OF THE DRAWINGS

Figure 2:
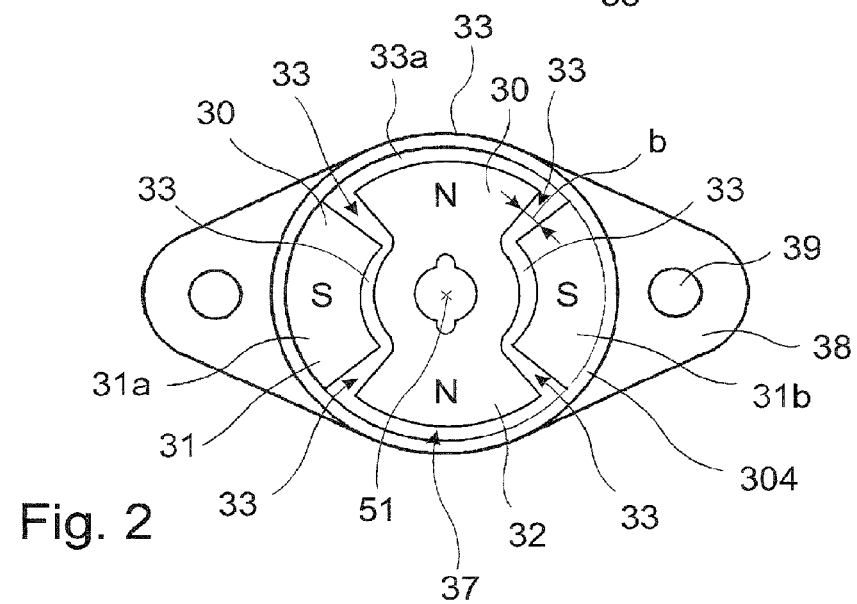
Figure 3A:
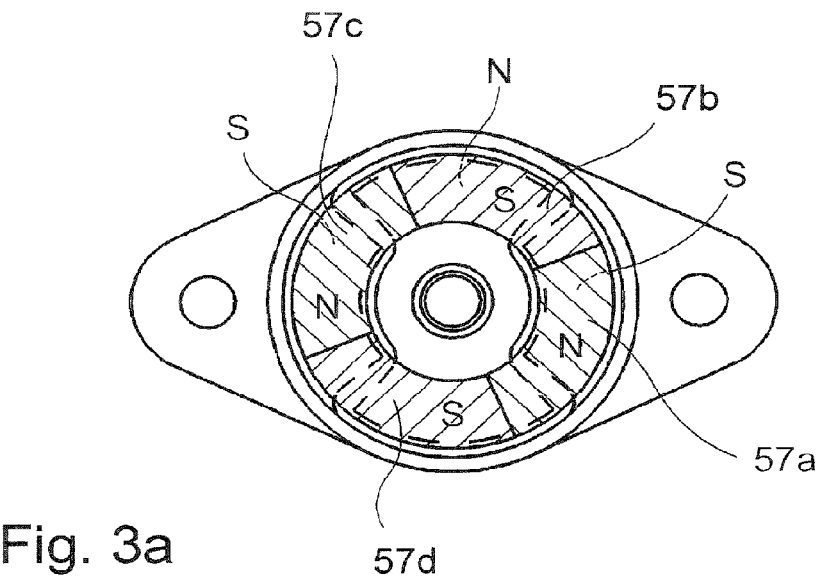
Figure 3B:
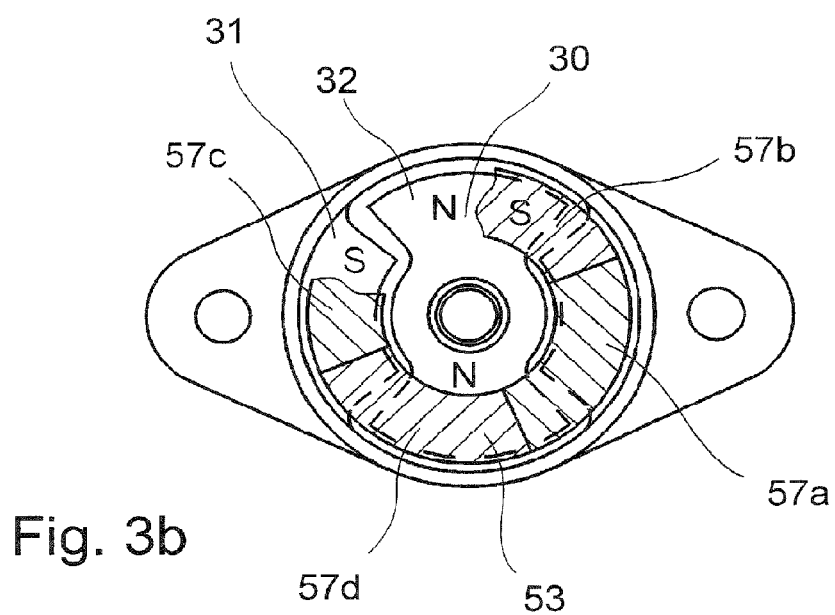

In the drawing the invention is shown schematically in an embodiment. In the figures:

FIG. 1: a section through a Rotary Solenoid according to the invention;

FIG. 2: a view on the Rotary Solenoid according to the invention, according to arrow II in FIG. 1 with dismantled rotor;

FIGS. 3a, 3b: in a top view (similar to FIG. 2) the Rotary Solenoid according to the invention with two different positions of the rotor.

Figure 3C:
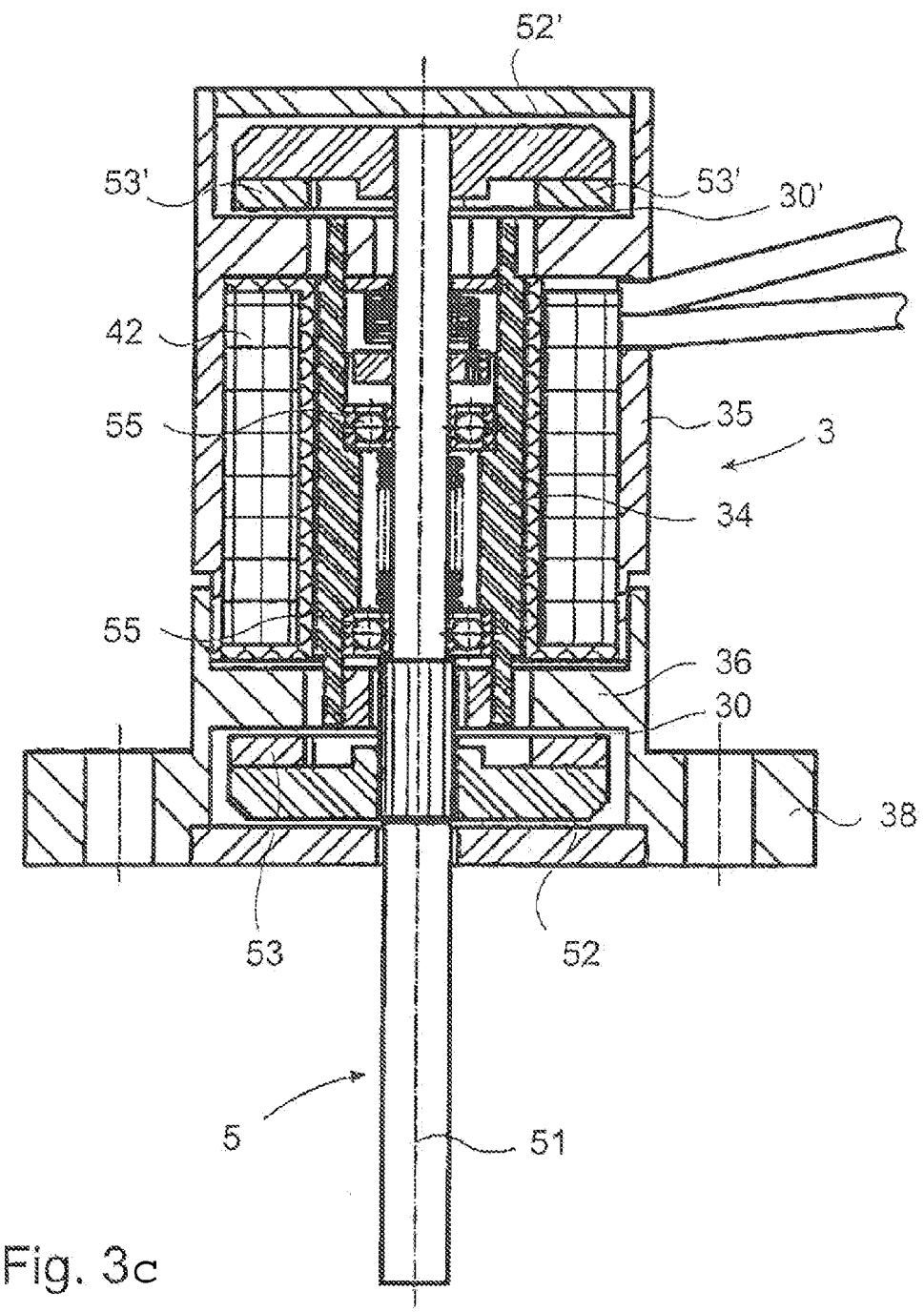

FIG. 3c: a section through the Rotary Solenoid according to the invention, similar to FIG. 1.

DETAILED DESCRIPTION OF THE PREFERRED EMBODIMENT

In the figures identical or corresponding elements each are indicated by the same reference numbers, and therefore are not described anew, if not useful.

The Rotary Solenoid 1 according to the invention is shown schematically in a sectional view in FIG. 1. The Rotary Solenoid 1 comprises essentially a stator 3 and a rotor 5. The stator 3 receives the coil 4, the rotor 5 rotates around the rotational axis 51.

In the example shown here the stator 3 consists of two parts, namely the case part 35 and the lid part 36. The case part 35 is designed pot-like and receives the coil 4. At the same time, in particular the case part 35 acts as housing and terminates the Rotary Solenoid 1.

The outer shape of the case part 35 is here pot-like, wherein concentrically a center pole 34 is provided pin-like on which the coil form 41 of the coil 4 can be put. On the inside of the center pole 34 two pivot bearings 55 are provided somewhat spaced apart from each other with respect to the rotational axis 51 the pivot bearings supporting radial the rotor shaft 50 of the rotor 5 in the stator. Seen in axial direction the center pole 34 projects in the direction of the lid part 36 beyond the end of the coil 4. Thus it forms a pin-like support; the center pole 34 is arranged coaxially to the rotational axis 51.

The coil 4 is formed by an essentially cylinder-shaped coil form 41 carrying the windings 42. The windings 42 consist of an electrically conductive wire. The windings are on the coil form; the coil form and thus also the windings 42 are arranged in the stator 3 in such a way that they encircle the rotational axis 51.

On the side of the stator 3 opposite the lid part 36, in the bottom area 302 an opening for the connecting cable 43 of the winding 42 is provided.

In the example shown here, in the stator 3 only one coil 4 is provided, however, without restricting the invention to that. It is possible in the same way to arrange several coils 4 axially one behind the other with reference to the rotational axis 51 each coaxial to the rotational axis 51. Thus it is possible, for example, in a sort of modular concept to realize or adapt with a few components a larger series of Rotary Solenoids 1 with respect to their development of power.

The stator 3 is then designed accordingly longer.

The multi-part construction of the stator 3, divided in a case part 35 and a lid part 36, makes assembly of the Rotary Solenoid 1 according to the invention considerably easier. When the lid part 36 is removed, it is possible to assemble the coil 4 in the case part 35, in particular to slip it on the center pole 34. The center pole 34 is designed sleeve-like and hollow inside to receive the rotor shaft 50. In the center pole 34 also a pivot bearing 55 is inserted and, if necessary, pressed in; for that an appropriate collar is provided in the center pole 34. Furthermore, the stator 3 has a sealing part 303 provided in the bottom area 302 sealing the stator 3 on the side opposite the free end of the rotor shaft 50, and by which the pivot bearing 55 on the back can be built in the center pole 34.

The lid part 36 is slid on the case part 35 in axial direction (with reference to the rotational axis 51) and pressed together with it. In the embodiment shown here of the Rotary Solenoid according to the invention the lid part 36 is the pole face 30 and can, in another possible embodiment, also receive or carry the partial pole faces 31, 32.

The stator 3 serves for guiding the magnetic field generated by the coil 4 when the windings 42 carried by the coil 4 are supplied with current. The connection between the case part 35 and the lid part 36 is designed such that conduction of the magnetic flow is not impaired, if possible.

The lid part 36 also has the function of providing a fastening of the Rotary Solenoid 1 according to the invention. For that a fastening flange 38 projecting preferably on both sides is formed on the lid part 36 with a fastening opening 39 through which appropriate fastening screws (not shown) can be threaded.

The rotor 5 has a rotor shaft 50 that is about 1.5 to 3 times, preferably about 1.8 to 2.2 times longer than the length of the stator 3. In the center the rotor shaft 50 carries the rotor disc 52. Linked to this, shown on the left hand side in FIG. 1, is the area of the rotor shaft 50 projecting in the stator and in which both pivot bearings 55 are supported. On the end of the rotor shaft 50 on the side of the stator a pull-back spring 56 is provided for the rotor.

On the part (shown in FIG. 1 on the right hand side) of the rotor shaft 50 projecting to the outside beyond the stator 3 accordingly elements can be linked that can be controlled because of the rotary motion of the Rotary Solenoid 1. For that the rotor shaft 50 penetrates a cover disc 300 covering the rotor disc 52.

On the cover disc 300 also a limit 8 on the angle of rotation for the rotor 5 is provided. In the embodiment shown here the limit 8 on the angle of rotation is formed by two slot-like recesses or openings 301 in the cover disc 300 extending in the direction of the circumference. On the rotor disc 52 rebounding bodies 80 projecting in the openings 301 are provided that are, for example, equipped with an elastomer or consist of an elastomer. These rebounding bodies 80 limit the rotational motion of the rotor 5.

In the example shown here the rotor disc 52 carries a ring 53 of permanent magnets the pole arrangements of which is, however, chosen in such a way that it is changing, that means alternating in the direction of the circumference (with reference to the rotation of the rotational axis, around the rotational axis 51).

In another possible embodiment of the invention the rotor shaft 50 can carry two rotor discs 52, the coil 4 then being provided between the two rotor discs 52. Through this embodiment the concept for the distribution of the magnetic flow is realized on both sides of the coil 4. This means also the pole face 30 facing the second rotor disc 52 is formed of at least two partial pole faces 31, 32 serving for the guide of the magnetic flow of the magnetic field generated by the winding of the coil 4 when they are supplied with current. This pole face 30 can, according to the invention, have all characteristics as they have been described for the first pole face 30. The resulting magnetization is also alternating with reference to the rotational axis 51 seen in the direction of circumference. Besides this embodiment, of course also a cascade-like or alternating arrangement of several coils 4 and/or several rotor discs 52 is possible and can be realized.

Furthermore, all characteristics described in connection with FIG. 1 can be transferred to the other possible embodiments as described before, and can be combined with these embodiments.

FIG. 2 shows the design of the pole face 30. The pole face 30 is in the example shown divided in two partial pole faces 31, 32. The partial pole face 30 is here arranged in the lid part 36 rectangular to the rotational axis 51. The lid part 36 is designed pot-like, and has a rotary limiting edge 304. This rotary limiting edge 304 is circular and coaxial to the rotational axis 51. The limiting edge 304 or a part of this limiting edge 304 also is part of the partial pole face 31 that is arranged as first partial pole face 31 on the outside, and encircles the second interior partial pole face 32. The pole face 30 or the partial pole faces 31 and 32 consist, in the same way as the rest of the stator 3, of soft-magnetic material to guide thus the magnetic field line perfectly.

These elements are part of the concept of magnetic flow of the stator 3.

It can be seen clearly in FIG. 2 that the (exterior) first partial pole face 31 is arranged as ring segment spaced apart from the rotational axis 51, however, axial symmetric (mirror inverted) to a center axis.

The design chosen in FIG. 2 distinguishes two separated partial pole faces 31, 32; the construction shown here, however, can also be explained by means of three partial pole faces. In this example, the partial pole faces 31a, 31b are designed like ring segments, and have an outer diameter that is slightly larger than or at least of the same size as the outer diameter of the second center partial pole face 32. It is clear that it is not decisive for the invention whether the two partial pole faces 31*a*, 31*b* are now connected magnetically conducting through the rotary limiting edge 304 or not.

The effect of arranging these partial pole faces 31, 32 is now that the well-known point- or rotational-symmetric distribution of the field lines of a magnet coil is blurred when designing the single partial pole faces 31, 32. N and S, respectively, are the magnetic poles of the magnetic field generated by the coil. It is convenient here that between the partial pole face 32, enclosing also the rotational axis 51, and the laterally spaced partial pole faces 31, 31*a*, 31*b* a pole gap 33 exists. Alternatively, the pole gap 33 is either filled or not filled. This pole gap 33 is a corresponding resistance for the magnetic field lines.

Thus, in the direction of the circumference, seen with reference to the rotational axis, an alternating arrangement of north (N) and south (S) poles forms on the pole face 30. This alternating arrangement of magnetic poles is within the rotary limiting edge 304, however, slightly spaced apart from the rotational axis 51.

This arrangement is solved in a construction where the lid part 36 has a recess 37 in which the interior second partial pole face 32 can be put. Seen in detail, here the interior second partial pole face 32 is put on, pressed on or pushed on the pin-like end of the center pole 34. Besides a good mechanical fit the partial pole face 32 has also a good magnetic contact with the rest of the center pole 34.

The arrangement is here chosen such that the surface of the partial pole face 31, 32 facing the rotor disc 52 are coaxial to one another, that is the distance of the pole face 30 divided into several partial pole faces 31, 32 to the rotor disc 52 is the same all over so that an air gap 54 with the same extension occurs between the pole face 30 and the rotor disc 52 or the ring 53 of permanent magnets on the rotor disc 52.

As it can be seen clearly in FIG. 2 the pole gap 33 extends in radial direction (with reference to the rotational axis 51). The pole gap 33 is here, seen in the direction of the circumference, between the first partial pole face 31 and the second partial pole face 32. Thus the pole gap 33 extends, with respect to the radial direction, to the rotational axis 51, in contrast to this the breadth b of the pole gap is orthogonal to the extension of the pole gap 33.

Between the end of the second partial pole face 32 and the limiting edge 304 a pole gap 33, 33*a* extends, also seen in the direction of the circumference, the breadth of which is orientated radial.

The design of the second, interior partial pole face 32 is, seen in top view, like a rotating armature, also square-like, wherein the partial pole face 32 has to be distinguished in three areas. In a center area with an opening for leading through the rotor shaft 50 the partial pole face 32 is limited by a circular arc segment concentrically to the rotational axis. The length of the circular arc segment is here adapted to the length of the linked first partial pole face 31 that is more on the outside. It is about 105° and is preferably in an interval of 60° to 130°.

The two opposing outer areas linked to the center area are symmetric to one another and thus identical; they are characterized by a limiting edge extending radial to the rotational axis 51 and then ending in a limiting arc with larger diameter.

The arrangement is here chosen such that the air gap 54 between the ring 53 of permanent magnets (arranged on the rotor disc 52) is less than the pole gap 33 between the single partial pole faces 31, 32. The magnetic field lines emerging on the interior second partial pole face 32 thus have to overcome a smaller distance to the ring 53 of permanent magnets than to the adjacent other partial pole face 31.

The rotor disc 52 has on its side facing the coil 4 the ring 53 of permanent magnets the polarization of which alternates in such a way that on their surface facing the pole face 30 the sequence of the poles is for example N-S-N-S and so on.

On the side of the rotor disc opposite the ring 53 the limit 8 on the angle of rotation is provided; for that the rotor disc 52 carries the rebounding body 80.

The principle of function is described exemplarily in particular in FIGS. 3*a* and 3*b*. The view chosen in FIGS. 3*a*, 3*b* corresponds with the one in FIG. 2 wherein on the plane of the pole face 30 here also the ring 53 of permanent magnets 57*a*, 57*b*, 57*c*, 57*d* is shown.

The result of the design of the pole face 30, in the direction of the circumference in four different poles, is an about 90° division of the segments that is also realized in the arrangement of the permanent magnets 57*a*, 57*b*, 57*c* and 57*d* in the ring 53.

For a bit simpler orientation, in FIG. 3*b* a part of the ring 53 is broken up to show the pole face 30 and the partial pole faces 31 and 32, respectively, that are below. Their magnetic poles N and S are arranged on these partial pole faces; it can also be seen clearly that the single permanent magnet 57*b* is also marked by an S. Therefore the result is an arrangement of a south pole of the permanent magnet 57*b* above the north pole of the partial pole face 31 below. It is clear, that the magnetization of the permanent magnet 57*a, b, c, d* is indicated on the side facing the pole face 30. FIG. 3*a* shows the same situation as FIG. 3*b*, however, because of the construction one above the other the orientation is slightly more difficult. The pole information of the partial pole faces 31, 32 below the ring 53 have been indicated by a dashed line. It is clear that the polarity in the area of the pole face 30 or the first and second partial pole faces 31, 32 does not occur before the current has been supplied appropriately to the coil 4. The rotary motion is generated here by attraction or repulsion of the permanent magnet segments 57*a, b, c, d*. Because of the pole separation on the pole gaps 33 this effect occurs in all four segments; the length of the single permanent magnet segments corresponds with the ones in the area of the pole face. The result is a rotary motion of the ring 53 of permanent magnets anticlockwise.

Although the invention has been described by exact examples that are illustrated in the most extensive detail, it is pointed out that this serves only for illustration and that the invention is not necessarily limited to it as alternative embodiments and methods become clear for experts in view of the disclosure. Accordingly, changes can be considered that can be made without departing from the contents of the described invention.

The invention claimed is:

1. A rotary solenoid comprising a stator and a rotor rotatable around a rotational axis, wherein the rotor has a rotor shaft on which at least one rotor disc is arranged, and the rotor disc is magnetically polarized alternating in a circumferential direction, and the stator receives at least one coil that carries windings of electrically conducting wire, and the windings encircle the rotational axis, wherein the at least one coil is positioned coaxially with respect to the rotational axis, and between the at least one coil and the rotor disc a pole face that is arranged perpendicular to the rotational axis is provided that consists of at least two partial pole faces serving for the conduction of magnetic flux of a magnetic field generated by current applied to the windings of the at least one coil, so that on the pole face, with respect to the rotational axis seen in the circumferential direction, alternating magnetic polarization exists, and further wherein the rotor disc has a side facing away from the at least one coil, and a magnetically low effective or magnetically ineffective cover disc is provided, and the cover disc is movably connected to the rotor disc on the side facing away from the at least one coil.

2. The rotary solenoid according to claim 1, characterized in that a pole gap is provided between the partial pole faces, and wherein the pole gap extends in a radial direction with respect to the rotational axis.

3. The rotary solenoid according to claim 1, characterized in that a pole gap is provided between the partial pole faces, wherein the pole gap extends in a radial direction with respect to the rotational axis, and the pole gap is filled with a magnetically low effective or ineffective material or is designed as a pole air gap.

4. The rotary solenoid according to claim 1, characterized in that a first exterior and a second interior partial pole face are provided, and the first exterior partial pole face encircles at least partly the second interior partial pole face.

5. The rotary solenoid according to claim 1, characterized in that at least one partial pole face is axial symmetric.

6. The rotary solenoid according to claim 1, characterized in that the partial pole faces are coplanar.

7. The rotary solenoid according to claim 1, characterized in that a first exterior partial pole face and a second interior partial pole face are provided, and the second interior partial pole face is designed, seen from the top, longitudinally extending perpendicular to the rotational axis.

8. The rotary solenoid according to claim 1, characterized in that different magnetic poles are associated with the different partial pole faces.

9. The rotary solenoid according to claim 1, characterized in that a first exterior partial pole face and a second interior partial pole face are provided, and the stator has a pin-like center pole penetrating the at least one coil and carrying the second interior partial pole face.

10. The rotary solenoid according to claim 1, characterized in that the stator surrounds or encircles the at least one coil and serves as a housing, wherein the stator guides the magnetic flux of the magnetic field generated by the current applied to the winding of the at least one coil, and is manufactured of soft magnetic iron.

11. The rotary solenoid according to claim 1, characterized in that the stator comprises at least one casing part and one lid part wherein the casing part receives the at least one coil, and the lid part is connected to the casing part and seals it, or the stator forms a partial pole face wherein the partial pole face is arranged in or on the lid part.

12. The rotary solenoid according to claim 1, characterized in that a pole gap is provided between the partial pole faces, and the stator comprises at least one casing part receiving the at least one coil, and one lid part connected to the casing part and sealing it, wherein the lid part of the stator, has a recess in the area of a first partial pole face for receiving a second partial pole face, the contour of which corresponds with the contour of the second partial pole face, wherein between the two partial pole faces the pole gap extends at least partly.

13. The rotary solenoid according to claim 1, characterized in that a casing part receiving the at least one coil, and a lid part connected to the casing part and sealing it are provided, wherein on the lid part at least one fastening opening is provided.

14. The rotary solenoid according to claim 1, characterized in that a first exterior partial pole face and a second interior partial pole face are provided, and the rotor disc has a side facing the at least one coil, and the rotor disc carries on the side facing the at least one coil at least one ring of permanent magnets, wherein the length of the second interior partial pole face corresponds essentially with the radius of the ring of permanent magnets, wherein a parallel arrangement of the pole face to the rotor disc and the ring of permanent magnets, respectively, is provided.

15. The rotary solenoid according to claim 1, characterized in that a pole gap is provided between the partial pole faces, and the rotor disc has a side facing the at least one coil, and the rotor disc carries on the side facing the at least one coil at least one ring of permanent magnets, wherein an air gap in an axial direction with reference to the rotational axis between the pole face and the rotor disc and the ring of permanent magnets, respectively, is smaller than the pole gap, wherein a sum of a breadth of the air gap in the axial direction with reference to the rotational axis between the pole face and the rotor disc and the thickness of the ring of permanent magnets is less than a breadth of the pole gap.

16. The rotary solenoid according to claim 1, characterized by a one-sided design of the rotor disc.

17. The rotary solenoid according to claim 1, characterized in that a coil body is provided, and the rotor shaft carries at least two rotor discs, and the coil is provided between the two rotor discs, or at least a partial pole face is held by the coil body in the at least one coil.

18. The rotary solenoid according to claim 1, characterized in that a limit on the angle of rotation of the rotor disc or at least one pivot bearing of the rotor in the stator or several coils carrying windings and arranged one behind the other is/are provided in the stator.

19. The rotary solenoid according to claim 1, characterized in that the at least one coil has a base, and an arrangement of the at least one coil coaxial with reference to the rotational axis or a cylinder-shaped design or an elliptic base of the at least one coil is provided.

* * * * *